Figure 1:
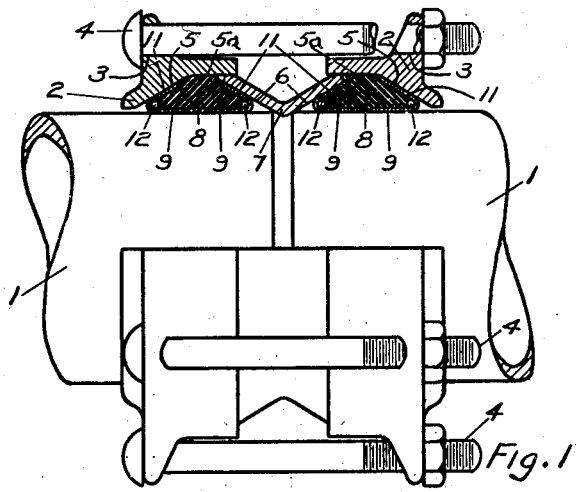

April 24, 1934.  F. J. RAYBOULD  1,955,832

CONNECTER

Filed May 5, 1933  2 Sheets-Sheet 1

INVENTOR.
Frank J. Raybould
BY
ATTORNEYS.

April 24, 1934.  F. J. RAYBOULD  1,955,832
CONNECTER
Filed May 5, 1933  2 Sheets-Sheet 2

Frank J. Raybould
INVENTOR.

BY
ATTORNEYS.

Patented Apr. 24, 1934

1,955,832

UNITED STATES PATENT OFFICE 1,955,832

CONNECTER

Frank J. Raybould, Erie, Pa.

Application May 5, 1933, Serial No. 669,484

14 Claims. (Cl. 285—132)

Connecters in many environments are subjected to severe axial stresses. Where the connecter is used for pipe, or conduit connections the tensile strength of the connection formed is of very great importance. Some conduits, such as high pressure lines, are subjected to tremendous pressures in order to increase the quantity of fluid flowing through them. Other forms of conduits, such as thin-walled conduits, may be so thin as to exclude the use of threads upon them and difficulty is experienced in connecting such conduit so as to form a sealed joint and a joint of sufficient tensile strength to permit of the use of such conduit in its ordinary environments.

The present invention is designed to form a connecter of comparatively universal application which makes it possible to connect two members without threads, or by engagement with the walls of the members. In carrying out the invention, the unit of the connection is formed with outer and inner walls, one within the other, and supplemented with means completing the end walls of a chamber in which may be confined a compressible member, preferably a ring, or bushing, of resilient rubber. The invention also contemplates interposing between this compressible member and one of the members to be connected a metal band of non-flowing characteristic under the stresses to which it is subjected, said band being slotted, or severed, to permit it to adjust itself to the wall to be engaged. The invention also contemplates means for applying pressure to the compressible member to distort the same into fluid pressure relation with the walls of the chamber so as to force the band into locking engagement with a member to be connected. The compressible member, such as rubber, under this pressure acts substantially as a fluid and exerts a pressure on the band corresponding to the pressure exerted upon the compressible member. In this way very high pressures may be exerted on the band so as to enforce its engagement with the member to be connected and also to distribute that pressure evenly throughout the band. The invention contemplates the use of a non-flowing metal, preferably ferrous metal, such as steel, the important quality of the band being that it will resist flow, or disintegration, when the member engaged is subjected to a severe pull. In this way, the tensile strength of the joint is increased very much above the tensile strength that can be accomplished by the direct engagement of the rubber, or by an engagement of a metal which does not maintain its shape under stress. Preferably also the invention contemplates the use of bands for sealing the joint at the end wall of the chamber and one of the members and this is preferably accomplished by supplying a band of angle form in cross section, one face engaging the end wall and the other the peripheral wall. The invention further contemplates the re-enforcement of such an angle form of band, preferably by the use of a re-enforcing ring in the angle. The invention also contemplates preferable forms of connecting units so as to connect members having an end to end relation. Other features and details of the invention will appear from the specification and claims.

A preferable embodiment of the invention is illustrated in the accompanying drawings as follows:—

Fig. 1 shows an elevation, partly in section, of a coupling including a joint.

Figure 2:
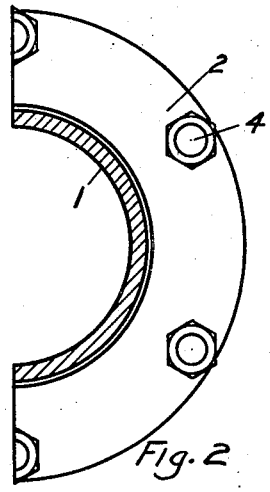

Fig. 2 an end view of one half the coupling.

Figures 3, 4:
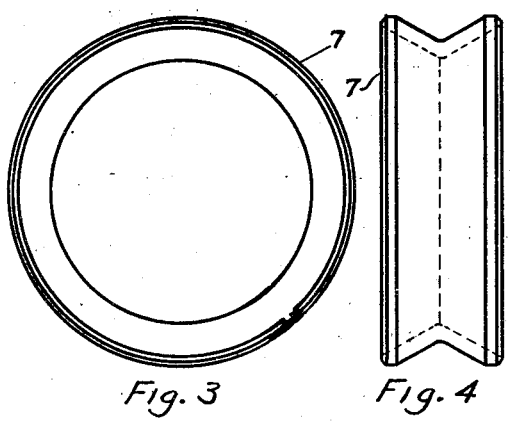

Fig. 3 an end view of a dividing ring forming part of the coupling.

Fig. 4 a side elevation of the same.

Figures 5, 6, 6A, 6B:
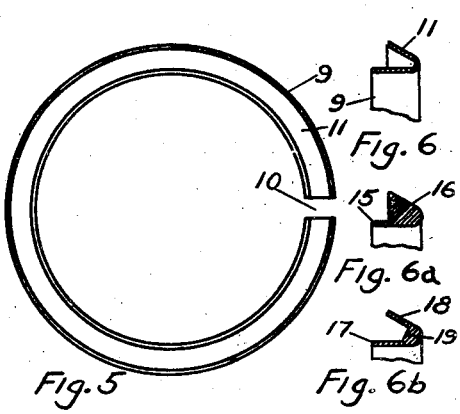

Fig. 5 an end view of a slotted band of angle form in cross section.

Fig. 6 a side elevation of the same.

Fig. 6a a modification of band.

Fig. 6b a further modification of the band.

Figures 7, 8:
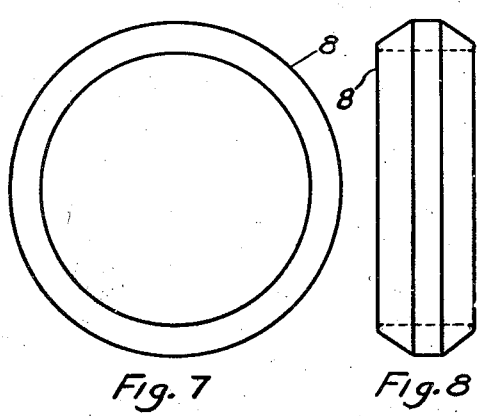

Fig. 7 an end elevation of the compressible member.

Fig. 8 is a side elevation of the same.

Figures 9, 10:
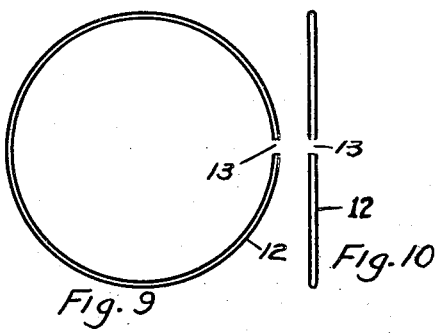

Fig. 9 an end elevation of a re-enforcing ring.

Fig. 10 an end elevation of the same.

Figure 11:
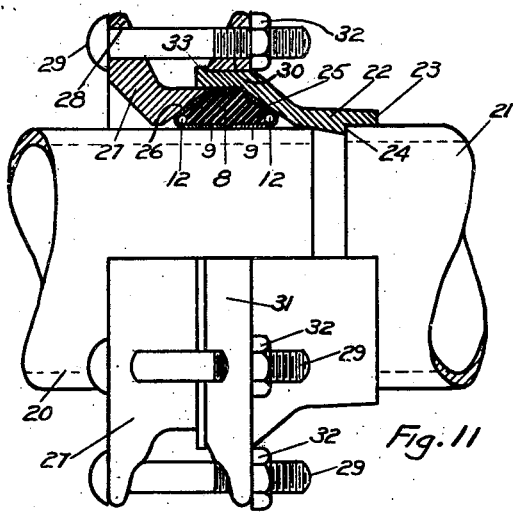

Fig. 11 an elevation, partly in section, of a pipe having a bell joint.

Figure 12:
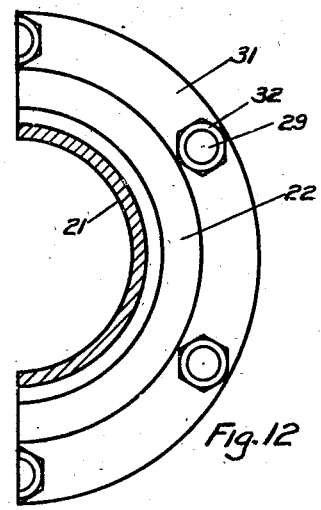

Fig. 12 a half end view of the structure shown in Fig. 11.

Figure 13:
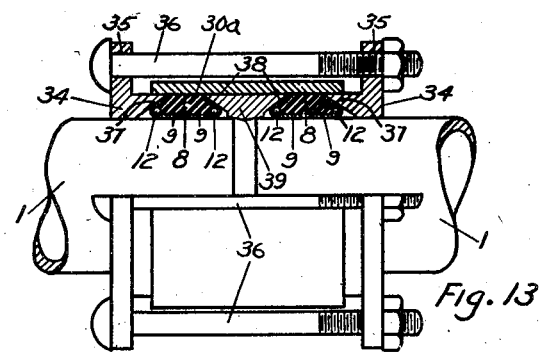

Fig. 13 an elevation, partly in section, of a modified coupling.

Figure 14:
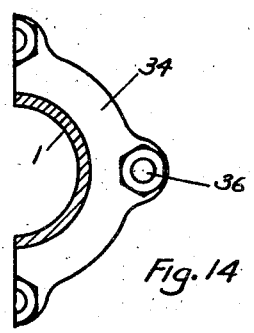

Fig. 14 a half end view of the structure shown in Fig. 13.

Figure 15:
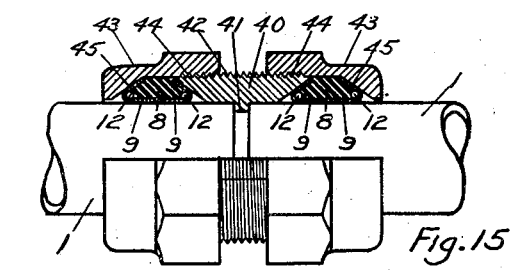

Fig. 15 an elevation, partly in section, of another modification of coupling.

Figure 16:
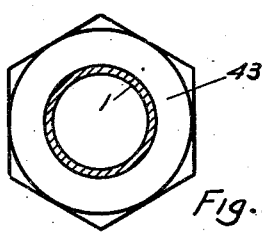

Fig. 16 an end view of the structure shown in Fig. 15.

Figure 17:
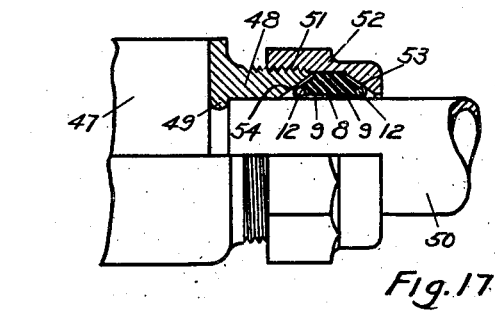

Fig. 17 an elevation, partly in section, of a conduit fitting showing its connection to a conduit.

In the modification shown in Fig. 1, 1—1 mark the two pipes arranged end to end. Clamping rings 2 are formed around the ends of the pipes, these rings having perforations 3 through which clamping bolts 4 extend, the clamping rings thus affording means for drawing the rings toward each other. The rings are provided with tapered walls 5 and peripheral walls 5a. Opposing the tapered walls 5 are tapered walls 6 which are formed on the opposite faces of a dividing ring 7, this dividing ring being preferably formed of sheet metal of substantially uniform cross dimension.

Compressible members 8 in the form of rubber rings are arranged in the chambers formed between the peripheral walls 5a and the walls of the members to be connected and the tapered walls 5 and 6. The compressible members conform in general to the shape of the chambers.

Bands 9 are interposed between the compressible members 8 and the surfaces of the pipes 1. These bands are slotted, the slot preferably extending entirely through the band at 10, as shown in Figs. 5 and 6. The slot in any event is such as to permit the contraction, or expansion, of the band without substantial stretching of the metal itself. The bands preferably have extensions 11 which give to the band an angular form and the extensions 11 preferably conform to the tapers of the surfaces 5 and 6. The bands are preferably re-enforced at the angle. This may be, and preferably is, accomplished by a re-enforcing ring 12 which is split at 13 and when assembled has the opening 13 out of register with the opening 10 so that the ring closes the slot in the band.

The members, or bands, are usually assembled on the compressible ring and the compressible ring inserted into the rings 2. These rings are then threaded on to the ends of the pipe and the dividing ring put in place. The clamping bolts are then inserted and pressure exerted on the rings toward each other and this pressure is communicated to the compressible members. The compressible members act substantially as a fluid under this pressure and thus completely fill the chamber in which they are confined, giving an effect similar to a hydraulic action and translating the endwise pressure of the rings into radial compression on the bands. The compressible members are preferably formed of rubber. The rubber should be freely resilient so as to resist to but a very small degree its distortion and comparatively fluid action. The bands assist in closing the joint between the ring and the pipe, some tolerance being necessary at this point and the rubber under the terrific pressure to which it is subjected seeks any outlet through which it may flow. The rubber, of course, has some resistance to flow and thus prevents its escape at the minute opening formed at the slots 10 and along the faces of the walls 5 and its strength and resistance to flow is sufficient to prevent such a leak.

The rubber is almost entirely enclosed and protected from the action of any material that may be passing the joint, or from the outer air. The rubber engages the walls and forms a perfect seal where the bands fail to make a complete closure. Preferably, therefore, the rubber extends beyond the bands 9 into engagement with the surface of the pipe and also engages the outer peripheral wall 5a.

The re-enforcing rings 12 not only assist in sealing the structure, but they prevent the rupture of the band at the angle, this rupture being apt to happen under the tremendous pressure to which the structure is subjected.

The bands are formed of non-flowing metal, that is, non-flowing, or disintegrating through the stresses to which such joints are subjected. Lead, or easy-flowing metal, flows much as rubber does and readily disintegrates and in consequence does not make a desirable engagement of the pipes. Preferably these bands are of non-flowing metal which, under most conditions, means resilient metal, and the preferable metal is steel. With this sort of metal as a band the tensile strength of the joint is increased very much over what is possible where the rubber alone engages the surface of the pipe.

The dividing ring 7 extends between the ends of the pipe and thus positions them in the joint, but at the same time, by reason of the beveled surface permits slight expansion of the pipe and slight relative changes between the ends. The outer ends of the dividing ring 7 extend into the rings 2 and are, therefore, re-enforced by these rings. If there is any tendency of the rings 7 at the opening between the ends of the conduit to yield radially under the pressure in the pipe this radial movement is compensated for by an end movement, or spreading movement of the outer ends of the ring, which spreading movement is opposed by the pressure of the compressible member. Thus a comparatively light ring 7 may be used with safety for very high pressures.

The modification of band 15 shown in Fig. 6a has the base of the band 15 provided with a re-enforcing rib 16 along the edge, the re-enforcing being integral with the band.

Similarly the modification shown in Fig. 6b shows a base 17, an extension 18 with a re-enforcing thickness 19 at the angle.

In the modification shown in Figs. 11 and 12, pipes 20 and 21 are to be connected. The pipe 21 has a bell 22 with an extension 23 secured to the pipe, a shoulder 24 being provided to smooth the joint. The inner face 25 of the bell forms an end surface of a joint chamber and an opposing surface 26 on the ring 27 forms the opposite end of the chamber. The ring 27 has perforations 28 through which clamping bolts 29 extend. The bolts extend through openings 30 in a clamping ring 31 and the bolts are provided with nuts 32 by which the clamping action may be exerted and the clamping ring 31 engages a shoulder 33 on the bell 22. The chamber is formed between the outer end of the bell and the smooth end of the pipe 20. The locking and engagement unit is similar to that shown in Fig. 1. It comprises the compressible member 8 and bands and re-enforcing rings similar to those shown in Fig. 1 and their operation is similar. In the modification shown in Fig. 13, pipes 1—1 are arranged end to end. Clamping rings 34 surround the ends of the pipe. These are provided with openings 35 and clamping bolts 36 extend through the openings, these bolts being supplied with nuts by which the rings may be drawn together. The rings 34 have end walls 37 and these oppose end walls 38 formed on the ends of a dividing ring 39. A peripheral ring 30a is arranged on the dividing ring and forms the outer wall of the compressible member chamber. The compressible units are similar to those shown in Fig. 1, having the compressible members 8, bands 9, and re-enforcing rings 12 and operate in a manner similar to the structure shown in Fig. 1.

In the modification shown in Fig. 15, the pipes 1—1 are arranged end to end and a dividing ring 40 is provided with a spacing rib 41 against which the pipes abut. The dividing ring 40 is screw-threaded at 42 and clamping rings 43 have screw threads 44 operating on the threads 42. Beveled surfaces 45 form the ends of the sealing chambers on the rings 43 and oppose beveled ends 46 on the dividing ring 40. Compressible members similar to that shown in Fig. 1 are used in the chambers having the compressible members 8, bands 9 and re-enforcing members 12. These compressible members are put under pressure by screwing the rings 43 on the dividing member.

In Fig. 17 the joint is shown as applied to a conduit fitting. Here a conduit box 47 has an extension 48 with a guard rib 49. A conduit 50 extends into the extension 48 against the rib 49. The outer surface of the extension is screw-threaded at 51 and a clamping ring 52 is screwed on to the extension. The clamping ring has a tapered surface 53 forming the end of the compression chamber and opposes a beveled seating surface 54 on the end of the extension 48. Thus a chamber is formed between the ring 51 and the conduit in which the compression unit is placed for sealing and locking the joint, the compression unit being similar to that shown in Fig. 15 and the operation of setting up the joint being similar to that of the structure shown in Fig. 15.

What I claim as new is:—

1. In a connecter, the combination of outer and inner members, the outer of which is tubular, and spaced from the inner member; a compressible element of bodily distortable material between the outer and inner members; means for forming with said outer and inner members a confining chamber with outer, inner and end walls enclosing and confining the compressible element, pressure applying means for reducing the size of said chamber whereby the compressible element is distorted into fluid pressure relation with the walls of said chamber; and a slotted band of non-flowing metal interposed between the compressible element and one of the members and so arranged as to receive and transmit radial pressure from the element to the said one of the members.

2. In a connecter, the combination of outer and inner members, the outer of which is tubular, and spaced from the inner member; a compressible element of bodily distortable material between the outer and inner members; means for forming with said outer and inner members a confining chamber with outer, inner and end walls enclosing and confining the compressible element, pressure applying means for reducing the size of said chamber whereby the compressible element is distorted into fluid pressure relation with the walls of said chamber; and a slotted band of non-flowing metal interposed between the compressible element and one of the members and so arranged as to receive and transmit radial pressure from the element to the said one of the members, said band abutting an end wall of the chamber.

3. In a connecter, the combination of outer and inner members, the outer of which is tubular, and spaced from the inner member; a compressible element of bodily distortable material between the outer and inner members; means for forming with said outer and inner members a confining chamber with outer, inner and end walls enclosing and confining the compressible element, pressure applying means for reducing the size of said chamber whereby the compressible element is distorted into fluid pressure relation with the walls of said chamber; and a slotted band of non-flowing metal interposed between the compressible element and one of the members and so arranged as to receive and transmit radial pressure from the element to the said one of the members, said band abutting an end wall of the chamber and closing a joint between said end wall and one of the members.

4. In a connecter, the combination of outer and inner members, the outer of which is tubular, and spaced from the inner member; a compressible element of bodily distortable material between the outer and inner members; means for forming with said outer and inner members a confining chamber with outer, inner and end walls enclosing and confining the compressible element, the end wall of the chamber being tapered; pressure applying means for reducing the size of said chamber whereby the compressible element is distorted into fluid pressure relation with the walls of said chamber; and a slotted band of non-flowing metal interposed between the compressible element and one of the members and so arranged as to receive and transmit radial pressure from the element to the said one member, said band abutting the tapered end wall and being of angle form in cross section conforming to the bevel of the end wall.

5. In a connecter, the combination of outer and inner members, the outer of which is tubular, and spaced from the inner member; a compressible element of bodily distortable material between the outer and inner members; means for forming with said outer and inner members a confining chamber with outer, inner and end walls enclosing and confining the compressible element, pressure applying means for reducing the size of said chamber whereby the compressible element is distorted into fluid pressure relation with the walls of said chamber; and a slotted band of non-flowing metal interposed between the compressible element and one of the members and so arranged as to receive and transmit radial pressure from the element to the said one of the members, said band being of angle form in cross section and abutting an end wall of the chamber, said band being re-enforced at the angle.

6. In a connecter, the combination of outer and inner members, the outer of which is tubular, and spaced from the inner member; a compressible element of bodily distortable material between the outer and inner members; means for forming with said outer and inner members a confining chamber with outer, inner and end walls for confining the compressible element, pressure applying means for reducing the size of said chamber whereby the compressible element is distorted into fluid pressure relation with the walls of said chamber; a slotted band of non-flowing metal interposed between the compressible element and one of the members and so arranged as to receive and transmit radial pressure from the element to the said one of the members, said band being of angle form in cross section and abutting an end wall of the chamber, and a re-enforcing ring at the angle of the band.

7. In a connecter, the combination of outer and inner members, the outer of which is tubular, and spaced from the inner member; a compressible element of bodily distortable material between the outer and inner members; means for forming with said outer and inner members, a confining chamber with outer, inner and end walls enclosing and confining the compressible element, pressure applying means for reducing the size of said chamber whereby the compressible element is distorted into fluid pressure relation with the walls of said chamber; and a slotted band of non-flowing metal interposed between the compressible element and one of the members and so arranged as to receive and transmit radial pressure from the element to the said one of the members, the rubber extending beyond the band and into engagement with the surface of the wall of the member to be united.

8. In a connecter, the combination of outer and inner members, the outer of which is tubular, and spaced from the inner member; a compressible element of bodily distortable material between the outer and inner members; means for forming with said outer and inner members a confining chamber with outer, inner and end walls enclosing and confining the compressible element, pressure applying means for reducing the size of said chamber whereby the compressible element is distorted into fluid pressure relation with the walls of said chamber; and a slotted band of non-flowing metal at each end of the chamber interposed between the compressible element and one of the members and so arranged as to receive and transmit radial pressure from the element to the said one member, each band abutting an end wall of the chamber and closing a joint between the end wall and the member to be connected.

9. In a connecter, the combination of outer and inner members, the outer of which is tubular, and spaced from the inner member; a compressible element of bodily distortable material between the outer and inner members; means for forming with said outer and inner members a confining chamber with outer, inner and end walls enclosing and confining the compressible element, pressure applying means for reducing the size of said chamber whereby the compressible element is distorted into fluid pressure relation with the walls of said chamber; and a band of non-flowing metal at each end of the chamber interposed between the compressible element and one of the members and so arranged as to receive and transmit radial pressure from the element to the said one member, said bands being of angle form in cross section and abutting the end walls of the chamber.

10. In a connecter, two members to be connected arranged end to end; a compressible element around each member to be connected; means forming with said members enclosing chambers confining the compressible elements; pressure applying means for reducing the size of said chambers, whereby the compressible elements are distorted into fluid pressure relation with the walls of the chambers; and a slotted band of non-flowing metal interposed between each compressible element and its member and so arranged as to receive and transmit radial pressure from the element to its member.

11. In a connecter, two members to be connected arranged end to end; a compressible element around each member to be connected; means forming with said members enclosing chambers confining the compressible elements; pressure applying means for reducing the size of said chambers, whereby the compressible elements are distorted into fluid pressure relation with the walls of the chambers; and a slotted band of non-flowing metal interposed between each compressible element and its member and so arranged as to receive and transmit radial pressure from the element to its member, said bands being of angle form.

12. In a connecter, two members to be connected arranged end to end; a compressible element around each member to be connected; means forming with said members enclosing chambers confining the compressible elements; pressure applying means for reducing the size of said chambers, whereby the compressible elements are distorted into fluid pressure relation with the walls of the chambers; and a slotted band of non-flowing metal interposed between each compressible element and its member and so arranged as to receive and transmit radial pressure from the element to its member, said bands being of angle form and re-enforced at the angle.

13. In a connecter, two members to be connected arranged end to end; a compressible element around each member; means forming with said members chambers enclosing and confining the compressible elements comprising clamping rings surrounding members and a dividing ring between the chambers; pressure applying means acting through the pressure rings reducing the size of the chambers, whereby the compressible members are distorted into fluid pressure relation with the walls of the chambers; and slotted bands of non-flowing metal interposed between each compressible element and its member and so arranged as to receive and transmit radial pressure from the element to its member.

14. In a connecter, two members to be connected arranged end to end; a compressible element around each member to be connected; means forming with said members enclosing chambers confining the compressible elements comprising clamping rings having opposing tapered surfaces and a dividing ring having tapered surfaces; and bands of angle form at each end of each compressible element, the angle conforming to the bevel of the clamping rings and the dividing ring each band having an angle portion between its element and member and so arranged as to receive and transmit radial pressure from its element to its member.

FRANK J. RAYBOULD.